United States Patent [19]

Duthoo

[11] Patent Number: 5,231,261
[45] Date of Patent: Jul. 27, 1993

[54] EQUIPMENT AND UNIT FOR WELDING BY LASER, FUEL RODS OR THE LIKE

[75] Inventor: Dominique Duthoo, Romans, France

[73] Assignee: Societe Franco-Belge de Fabrication de Combustibles, Paris, France

[21] Appl. No.: 766,840

[22] Filed: Sep. 27, 1991

[30] Foreign Application Priority Data

Oct. 8, 1990 [FR] France ............................... 90 12361

[51] Int. Cl.⁵ ............................................. B23K 26/00
[52] U.S. Cl. ......................... 219/121.63; 219/121.74; 219/121.76; 219/121.83
[58] Field of Search .................... 219/121.63, 121.64, 219/121.74, 121.76, 121.83; 376/326, 247, 261, 413

[56] References Cited

U.S. PATENT DOCUMENTS

| | | | |
|---|---|---|---|
| 3,774,010 | 11/1973 | Heer et al. | 219/121.6 |
| 4,136,553 | 1/1979 | Jones | 376/326 |
| 4,727,237 | 2/1988 | Schantz | 219/121.63 |
| 4,837,419 | 6/1989 | Boatwright et al. | 219/61 |

FOREIGN PATENT DOCUMENTS

| | | | |
|---|---|---|---|
| 2305827 | 10/1976 | France | |
| 55-81096 | 8/1980 | Japan | |
| 0168488 | 10/1983 | Japan | 219/121.83 |
| 2070998 | 9/1981 | United Kingdom | |

*Primary Examiner*—C. L. Albritton
*Attorney, Agent, or Firm*—Frishauf, Holtz, Goodman & Woodward

[57] ABSTRACT

This equipment comprises a housing (6) rigidly fixed to the welding enclosure (5) and in which are rigidly mounted the various optical components necessary for focusing the laser beam transported by means of an optical fiber (20) to the joint (1) to be welded. The reflecting mirror (16) allows a small fraction of the laser beam, which is measured by a detector of luminous energy (8), to pass. The present invention is applicable to the manufacture of fuel rods, guide tubes and attached rods used in nuclear reactors.

15 Claims, 3 Drawing Sheets

EQUIPMENT AND UNIT FOR WELDING BY LASER, FUEL RODS OR THE LIKE

FIELD OF THE INVENTION

The present invention relates to welding by laser, especially of fuel rods or the like intended to be used in nuclear reactors. It relates more particularly to an item of equipment for welding by laser, of the type comprising an enclosure provided with a window, a laser source and means for transporting the laser beam emitted by this source to a welding zone through the window, these means comprising optical components, including at least one focusing lens and one reflecting mirror. "Fuel rods or the like" is understood to mean fuel rods, guide tubes and attached rods.

DESCRIPTION OF THE PRIOR ART

The fuel rods used in nuclear reactors are formed from a cladding tube made of a zirconium alloy, at the ends of which plugs of the same material, which are intended for hermetically sealing it, are force-fitted and then welded.

The rods contain a stack of fuel pellets held by bearing against one of the plugs (called lower plug) with the aid of a spring compressed between the fissile column and the opposite plug (upper plug). The upper plug comprises a small-diameter orifice enabling the fuel rod to be pressurised before plugging this hole by welding, this operation often being called "seal welding".

The length of a fuel rod is of the order of 4 meters and its diameter is approximately 10 mm for a thickness of approximately 0.6 mm.

The guide tubes are formed from a tube made of a zirconium alloy at the ends of which a plug (lower end) and a sleeve (upper end) are fitted and then welded.

The guide tube, of a thickness of approximately 0.5 mm, has a diameter of the order of 12 mm at the plug and of 14 mm at the sleeve, for a length of approximately 4 meters.

The attached rods comprise a cladding tube made of stainless steel of a length of approximately 4 meters by a diameter of the order of 10 mm and a thickness of approximately 0.4 mm, at the ends of which two plugs of the same material, which are intended for hermetically sealing it, are fitted and then welded.

They are not pressurised and, like the guide tubes, therefore comprise only two circular welds.

Thus, fuel rods or the like must undergo two circular welding operations and, if appropriate, a spot weld for the seal welding. For the component parts made of zirconium alloy, these welds must be carried out in an enclosure, under the protection of neutral gas in order to prevent any oxidation of the molten metal.

The circular welds must have a penetration greater than or equal to the thickness of the cladding, a width on the surface not exceeding 1.5 mm and a width as large as possible at the plug-cladding or sleeve-cladding interface (fitting diameter).

Taking into account the use of fuel rods or the like and the degree of quality required, any defect of the crack or lack of penetration type is not admissible.

The welds of a seal weld are carried out in an atmosphere of hyperbaric helium and consist in collapsing in the edges of a small-diameter orifice (typically less than 0.8 mm). Their penetration must be greater than or equal to the thickness of the tube with a high level of guarantee.

In order to achieve these objectives, the principle of equipment for welding by laser has been set out (see for example GB-A-2,070,998 or FR-A-2,305,827), without describing an actual technology.

SUMMARY OF THE INVENTION

The object of the invention is to provide an item of equipment capable of producing, under industrial conditions, the welds of the fuel rods or the like.

For this purpose, the subject of the invention is an item of equipment for welding by laser, of the type mentioned hereinabove, wherein: the reflecting mirror is partially transparent to the laser beam; and the said optical components are mounted rigidly in a housing which has an inlet arm for the laser beam; an outlet arm is fixed rigidly to the enclosure around the window of the latter; and an arm, opposite the inlet arm is equipped with a detector of luminous energy.

According to other characteristics of the invention:
- a port is mounted in the housing, and this housing comprises a gas inlet entering a volume of the outlet arm which communicates with the inner volume of the enclosure through the said window;
- the port is mounted in the outlet arm of the housing, the gas inlet entering just below this port and the enclosure comprising a gas leakage passage;
- the port is preceded by a focusing lens mounted in the outlet arm;
- a collimating lens is mounted in the inlet arm of the housing;
- collimating and focusing lenses frame the port and are mounted in the inlet arm of the housing:
- the reflecting mirror is transparent to visible light and an arm of the housing opposite the said outlet arm is equipped with a camera;
- the said transport means comprise an optical fiber which terminates in the inlet arm of the housing, the laser source being of the pulsed YAG type;
- when the equipment is intended for welding fuel rods or the like by laser, the enclosure comprises means for positioning and, optionally, rotatably driving a fuel rod;
- the outlet arm of the housing is rigidly fixed to the enclosure, directly or with an isolating valve in between.

The subject of the invention is also a unit for welding by laser, especially of fuel rods or the like, which comprises several items of equipment such as those defined hereinabove, with a single laser source and means for switching this laser source to any one of several optical fibers each belonging to one of these items of equipment.

For welding fuel rods or the like the said items of equipment may, in particular, comprise at least one item of lower plug welding equipment, one item of upper plug welding equipment and one item of seal welding equipment.

BRIEF DESCRIPTION OF THE DRAWINGS

Embodiments of the invention will now be described with reference to the attached drawings, in which.

DETAILED DESCRIPTION

Figure 1:
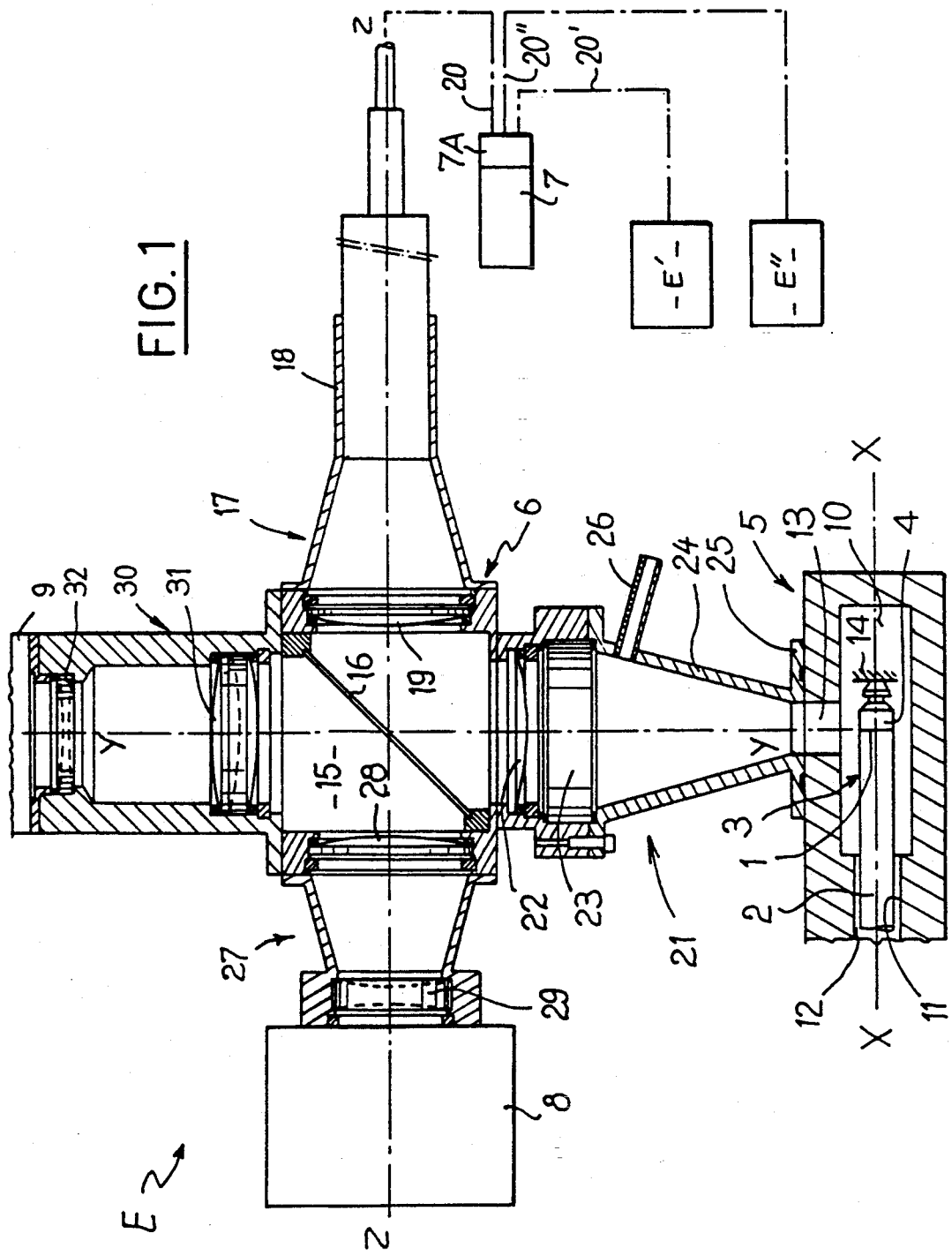
FIG. 1 shows, in longitudinal cross-section, a portion of an item of laser welding equipment according to the invention.

The laser welding equipment for the welding of fuel rods or the like shown in FIG. 1 is intended for producing a circular weld at the joint 1 between the tube 2 of a fuel rod 3 and a plug 4 fitted to one end of the latter. This equipment essentially comprises an enclosure 5, a housing 6, a pulsed YAG laser source 7 of 400 W power, an energy or power detector 8 integrating the signal over the entire duration of the signal, and a camera 9.

The enclosure 5 comprises a cavity 10 of axis X—X, assumed to be horizontal, in which the rod 3 may be inserted through a passage 11 providing a calibrated annular gap around the tube 2, and it has a lateral opening 13 forming a window. When the plug 4 of the fuel rod 3 is in contact with a stop 14 provided in the cavity 10, the plane of the joint 1 contains the axis Y—Y, assumed to be vertical, of the opening 13.

The housing 6, assumed to be disposed above the enclosure 5, comprises a parallelepipedal central body 15 in which a reflecting mirror 16, inclined at 45°, is mounted. This housing is open at four successive faces from which four arms leave:

- an inlet arm 17 of axis Z—Z parallel to the axis X—X, comprising a tubular support 18 and a collimating lens 19 adjacent to the body 15. An optical fiber 20 leaves the laser source 7 and terminates in the support 18, where its end is positioned along the axis Z—Z;
- an outlet arm 21 of axis Y-Y comprising successively, starting from the body 15, a focusing lens 22, a port 23 and a muff 24 whose end opening communicates with the opening 13 of the enclosure 5, this opening being fixed in a sealed manner by means of an end flange 25 of the muff. The port 23 is mounted with a seal between two flanges of the arm 21 which are assembled together, and a pipe 26 for supplying inert shielding gas enters the sleeve 24 just below this port, while evacuation of the gas is carried out through the abovementioned gap 12;
- a laser beam control arm 27, of axis Z—Z, situated opposite the arm 17. This arm 27 comprises converging 28 and diverging 29 optical lenses enabling the diameter of the beam to be adapted to the size of the detector 8, the latter being fixed to the end of the arm 27; and
- a visual control arm 30, of axis Y—Y, situated opposite the arm 21. This arm 30 comprises converging 31 and diverging 32 optical lenses enabling the diameter of the focusing lens of the beam to be adapted to the objective of the camera 9, the latter being fixed to the end of the arm 30.

The mirror 16 is a dichroic mirror which reflects the majority (for example 97%) of the incident laser beam ($\lambda = 1.06$ micron) and allows a small fraction of it to pass towards the detector 8. In addition, this mirror is transparent to visible light which enables the camera 9 to monitor, by reflex focusing and composing, the rod 3 through the lenses 32, 31 and 22, the mirror 16, the port 23 and the opening 13.

In operation, a fuel rod 3 is inserted into the enclosure 5 until it contacts the stop 14. It is then rotably driven about its axis X—X by means which are not shown, and the inert shielding gas is introduced into the enclosure via the pipe 26, the muff 24 and the opening 13. After a period of purging by the protective gas, the pulsed laser beam is transmitted via the optical fiber, collimated by the lens 19, reflected by the mirror 16 and focused by the lens 22 onto the joint 1.

The rigidity of the entire equipment, constituted by metallic components rigidly fixed to each other and comprising optical components fixed rigidly in the housing 6, ensures excellent focusing of the beam, in a fool-proof manner, at the location of the weld, and welds of high quality and good reproducibility. However, the equipment is demountable and permits easy maintenance, and especially easy demounting and maintenance of the port 23. In addition, the fact that gas arrives just below the port 23 effectively shields the latter from smoke particles due to the welding which are entrained by the gas, via the gap 12, to the outside of the enclosure.

When the circular weld is completed and the rod is cooled, the flow of protective gas is reduced, which enables the enclosure to be kept under an inert atmosphere, and the rod is removed from the enclosure 5 and then replaced by another rod to be welded.

The detector 8 enables the laser beam to be monitored and, for example, an alarm to be triggered in the event of deterioration of an optical component or of a malfunction of the laser source. The camera 9 enables the positioning of the rod in the enclosure 5 to be checked and, if appropriate, an alarm to be triggered as well.

Figure 2:
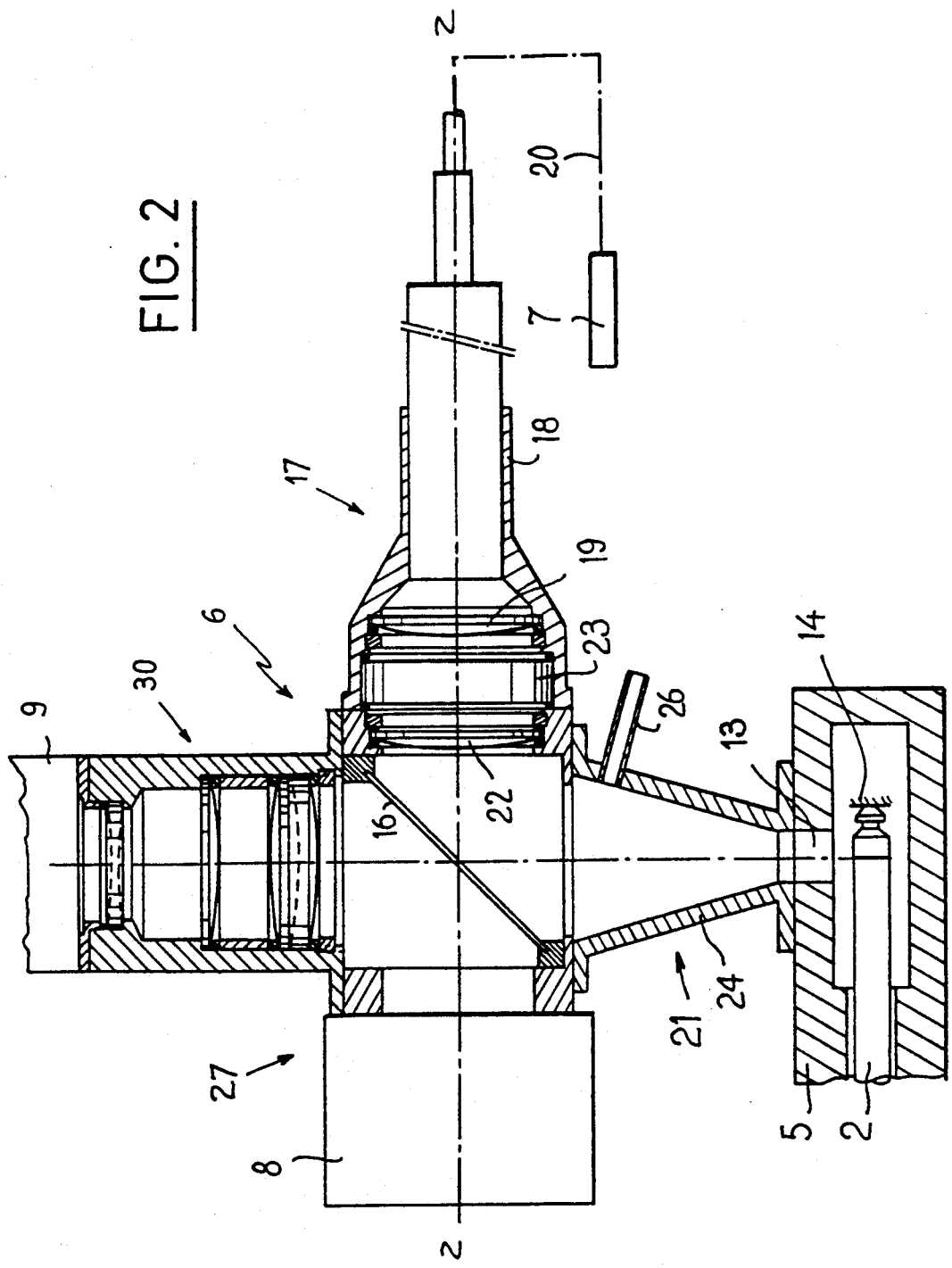
FIG. 2 is a similar view of an alternative form.

The alternative form of FIG. 2 differs from that of FIG. 1 by the fact that the port 23 and the focusing lens 22 are transferred to the arm 17 of the housing 6. Thus, this arm comprises, starting from the central body 15, the lens 22, the port 23 and the lens 19, and the inside of the muff 24 communicates directly with the inside of the body 15.

The advantage of this alternative form of FIG. 2 lies in the fact that the detector 8, which no longer has need for its own focusing lenses, measures directly the laser energy actually transmitted to the fuel rod. As a consequence, the reliability of the measurement makes it possible to better guarantee the welding energy supplied to the fuel rod.

As illustrated diagrammatically in FIG. 1, the unit advantageously comprises several items of equipment in parallel E, E', E'' and a single laser source 7. The latter, by virtue of suitable switching means 7A, transmits the laser beam successively via the optical fibers 20, 20', 20'' associated with various items of equipment such that one item of equipment produces a weld while the others undertake the related steps described hereinabove. Thus a high-productivity unit is obtained.

In a unit for welding fuel rods, some items of equipment may thus be assigned to the welding of the lower plugs, others to the welding of the upper plugs and yet others to the seal welding, and may be adapted to each of these operations. Thus in the case of seal welding, argon is replaced by helium under pressure and the enclosure is modified in such a manner that the window for inlet of the beam is facing the seal weld hole to be plugged. The seal weld enclosure has a very greatly reduced volume and is without means for rotatably driving the rod.

Figure 3:
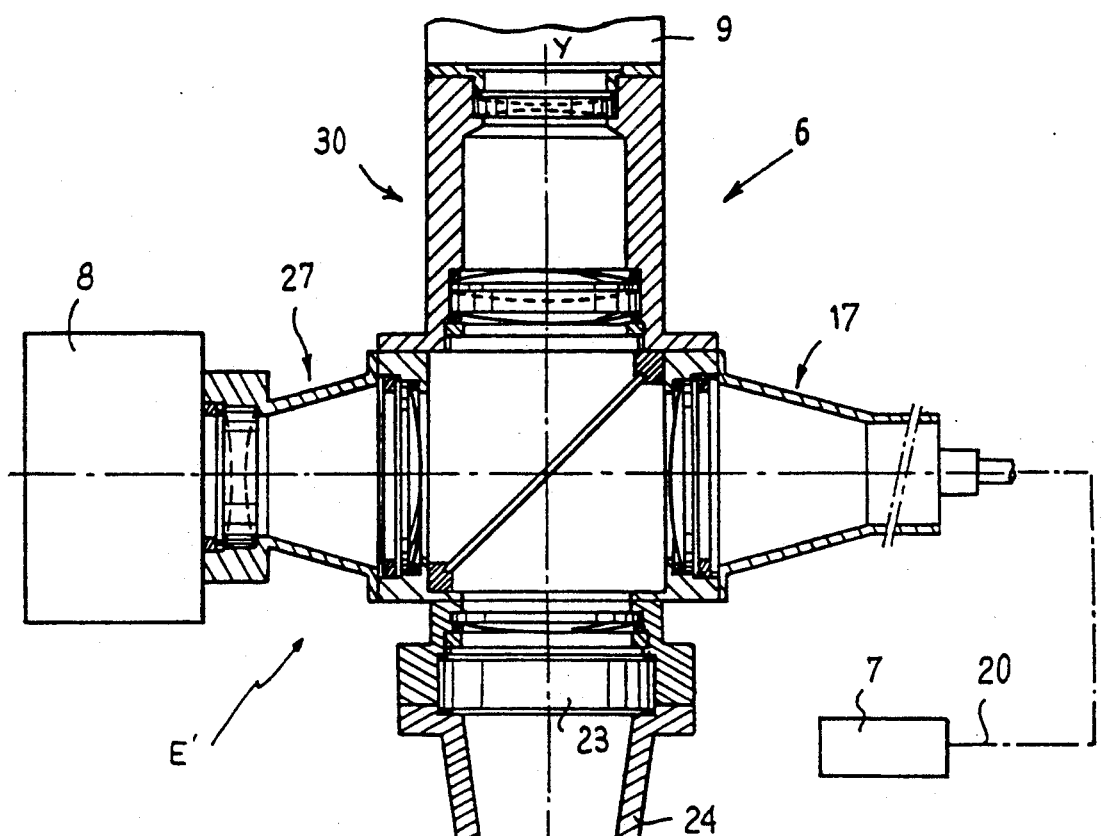
FIG. 3 shows, in cross-section, an item of seal welding equipment according to the invention.

FIG. 3 shows an item of seal welding equipment E'. The housing 6 is similar to that of FIG. 1, apart from the fact that the pipe 26 is connected to a source of helium at approximately 30 bar. The flange 25 of this housing is applied with a seal to the enclosure 5 by way of the parallelepipedal body 33 of a stop valve 34 having a spherical valve plug 35 and a rotary actuating shaft 36.

The enclosure 5, of the same general axis Y—Y as the muff 24, comprises, on the side of the housing 6, a cylindrical passage 37 entering into a stepped countersunk region 38 open towards the top. The passage 37 is equipped, at a short distance from this countersunk region, with a annular gasket 39 of the type having lips.

A bearing plate 40 is fixed in a sealed manner in the outer, larger-diameter portion of the countersunk region 38. This plate comprises in its centre the window 13 of the enclosure, of convergent-divergent shape. The internal portion 41 of this window forms a conjugate seat of the plug 4 of the fuel rods comprising the central seal weld hole to be closed off, these plugs having a frustoconical shape.

A pipe 42 of the enclosure 5 entering the internal part of the countersunk region 38 may, by means of a directional control valve (not shown), be connected selectively to a source of helium under a pressure slightly greater than atmospheric pressure, to a vacuum pump or to the atmosphere, or indeed be closed.

In service, the valve 34 being closed and in the absence of any rod, the enclosure 5 is subjected to purging with low-pressure helium via the pipe 42, the countersunk region 38 and the passage 37. A fuel rod 3 is inserted into the passage 37, through the seal 39, until its plug 4 bears on the seat 41, and then held by clamping means (not shown) provided in the enclosure. The pipe 42 is connected to the vacuum pump for evacuation of the air contained in the rod 3 and then closed, this evacuation phase being optional, however.

The valve 35 is opened, which completely fills the rod with helium at approximately 30 bar and offers a passage for the laser beam, through the cylindrical passage 43 of the valve plug, to the seal weld hole. The closing of the seal weld hole is then carried out, the valve 34 is closed again, the pipe 42 is set to atmosphere, the rod 3 is evacuated and the purging of the enclosure with helium by the low-pressure circuit is reestablished.

By virtue of the arrangement described comprising the valve 34 between the housing and the enclosure, the dead volume of helium under pressure surrounding the plug 4 and the adjacent portion of the rod is reduced to a strict minimum, and this also applies to the consumption of helium by the unit.

It is understood that the unit according to the invention may comprise any number of items of equipment for welding by laser for optimal use of the laser source, and may be applied to the high-quality welding of various types of industrial parts.

Moreover, one of the items of equipment may also serve to drill the seal weld holes, so that the word "welding" should consequently be understood in the widest sense.

What is claimed is:

1. Laser welding equipment comprising:
   an enclosure provided with a window;
   a laser source;
   transmission means for transmitting a laser beam emitted by said laser source to a welding zone through said window;
   said transmission means including a plurality of optical components having at least one focusing lens and a reflecting mirror;
   said reflecting mirror being partially transparent to said laser beam;
   said plurality of optical components in said transmission means being mounted rigidly in a housing having:
      an inlet arm for receiving said laser beam;
   an outlet arm fixed rigidly to the enclosure around said window of said enclosure; and
      another arm positioned opposite to said inlet arm, said another arm being equipped with a detector for detecting a luminous energy.

2. The equipment according to claim 1, wherein:
   a port is mounted in said housing; and
   said housing further comprises:
      a gas inlet communicating with a volume in said outlet arm; and
      said volume in said outlet arm communicating with an inner volume of the enclosure through said window.

3. The equipment according to claim 2, wherein:
   said port is mounted in said outlet arm of the housing;
   said gas inlet is positioned just below said port; and
   said enclosure comprises a gas leakage passage.

4. The equipment according to claim 3, wherein:
   said at least one focusing lens is positioned in said outlet arm; and
   said port is positioned in said outlet arm to be between said enclosure and said at least one focusing lens.

5. The equipment according to claim 4, further comprising a collimating lens mounted in said inlet arm of said housing.

6. The equipment according to claim 2, further comprising:
   a collimating lens mounted in said inlet arm of said housing; and wherein
   said at last one focusing lens is mounted in said inlet arm, and said port is positioned in said inlet arm between said at least one focusing lens and said enclosure.

7. The equipment according to claim 5, wherein:
   said reflecting mirror is transparent to visible light; and
   an arm of said housing, positioned to be opposite to said outlet arm, is equipped with a camera.

8. The equipment according to claim 1 wherein:
   said transmission means includes an optical fiber that terminates in said inlet arm of said housing; and
   said laser source comprises a pulsed YAG type laser.

9. The equipment according to claim 1, for welding fuel rods, wherein said enclosure further comprises means for positioning a fuel rod therein.

10. The equipment according to claim 9, wherein said enclosure further comprises means for rotatably driving said fuel rod.

11. The equipment according to claim 1, wherein said outlet arm of said housing is directly fixed, rigidly, to said enclosure.

12. The equipment according to claim 1, wherein said outlet arm of said housing is rigidly fixed to said enclosure with an isolating valve positioned therebetween.

13. A laser welding system including a plurality of laser welding units, comprising:
   a single laser source;
   each of said plurality of laser welding units including:
      an enclosure provided with a window;
      transmission means for transmitting a laser beam emitted by said single laser source to a welding zone through said windows;

said transmission means including a plurality of optical components having at least one focusing lens and a reflecting mirror;

said reflecting mirror being partially transparent to said laser beam;

said plurality of optical components in said transmission means being mounted rigidly in a housing having:

an inlet arm for receiving said laser beam emitted by said single laser source;

an outlet arm rigidly fixed to said enclosures around said window of said enclosures; and another arm positioned opposite to said inlet arm, said another arm being equipped with a detector for detecting a luminous energy; and switching means for switching said single laser source to any one of a plurality of optical fibers for respectively supplying said laser beam emitted by said single laser source to a respective one of said plurality of laser welding units.

14. The system according to claim 13, for welding at least one fuel rod, wherein:

at least one of said laser welding units includes:

a lower plug welding means for welding a lower plug portion of said at least one fuel rod;

an upper plug welding means for welding an upper plug portion of said at least one fuel rod; and a seal welding means for welding a seal hole in said at least one fuel rod.

15. The system according to claim 13, for welding at least one fuel rod, wherein the single laser source comprises a YAG type laser.

* * * * *